United States Patent
Kang et al.

(10) Patent No.: US 11,243,575 B1
(45) Date of Patent: Feb. 8, 2022

(54) ELECTRONIC DEVICE INCLUDING FLEXIBLE DISPLAY

(71) Applicant: Samsung Electronics Co., Ltd., Suwon-si (KR)

(72) Inventors: Youngmin Kang, Suwon-si (KR); Moonchul Shin, Suwon-si (KR); Yeonggyu Yoon, Suwon-si (KR); Seungjoon Lee, Suwon-si (KR); Joongyeon Cho, Suwon-si (KR); Junyoung Choi, Suwon-si (KR); Byounguk Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/365,583

(22) Filed: Jul. 1, 2021

(30) Foreign Application Priority Data

Oct. 29, 2020 (KR) ........................ 10-2020-0142197

(51) Int. Cl.
*G06F 1/16* (2006.01)

(52) U.S. Cl.
CPC .......... *G06F 1/1652* (2013.01); *G06F 1/1683* (2013.01); *G06F 1/1698* (2013.01)

(58) Field of Classification Search
CPC ...... G06F 1/1652; G06F 1/1683; G06F 1/187; G06F 1/1656; G06F 1/1633;
(Continued)

(56) References Cited

U.S. PATENT DOCUMENTS

| 7,298,337 B2 | 11/2007 | Seol et al. |
| 8,654,082 B2 | 2/2014 | Borgward |

(Continued)

FOREIGN PATENT DOCUMENTS

| JP | 04131890 U | 5/1992 |
| JP | 04133391 U | 12/1992 |

(Continued)

OTHER PUBLICATIONS

STIC search (Year: 2021).*
(Continued)

*Primary Examiner* — Hung S. Bui
*Assistant Examiner* — Sagar Shrestha
(74) *Attorney, Agent, or Firm* — Jefferson IP Law, LLP

(57) ABSTRACT

An electronic device is provided. The electronic device includes a flexible display, a first housing moving to correspond to change in a shape of the flexible display and including a contact region, a second housing sliding in a direction opposite to a direction in which the first housing moves of the first housing and to mount the flexible display, a rotary contact structure making contact with the contact region, and a printed circuit board (PCB) electrically connected with the at least one rotary contact structure. The at least one rotary contact structure includes a rotating part maintaining contact with the contact region while rotating in a process of changing a shape of the flexible display, a central part disposed inside the rotating part, a conductive member interposed between the rotating part and the central part, and a support part supporting the central part and electrically connecting the central part with the PCB.

18 Claims, 14 Drawing Sheets

(58) Field of Classification Search
CPC ........ G06F 1/1637; G06F 1/1675; G06F 3/03; G06F 3/0312; G06F 3/03548
See application file for complete search history.

(56) References Cited

U.S. PATENT DOCUMENTS

| | | | |
|---|---|---|---|
| 8,686,963 B2 | 4/2014 | Rolus Borgward | |
| 10,039,206 B1 | 7/2018 | Wishman et al. | |
| 10,067,538 B2 | 9/2018 | Sharma et al. | |
| 10,073,495 B2 | 9/2018 | Sharma et al. | |
| 10,078,345 B2 | 9/2018 | Rolus Borgward | |
| 10,079,425 B2 | 9/2018 | Chun et al. | |
| 10,101,768 B2 | 10/2018 | Rolus Borgward | |
| 10,152,093 B2 | 12/2018 | Sharma et al. | |
| 10,345,865 B2 | 7/2019 | Sharma et al. | |
| 10,571,976 B2 | 2/2020 | Sharma et al. | |
| 10,615,485 B2 | 4/2020 | Chun et al. | |
| 11,003,207 B2 | 5/2021 | Kim et al. | |
| 2003/0094354 A1 | 5/2003 | Badarneh | |
| 2006/0132366 A1 | 6/2006 | Seol et al. | |
| 2008/0049003 A1* | 2/2008 | Hasegawa ............. | G06F 1/1683 345/206 |
| 2009/0020969 A1 | 1/2009 | Nakagawa et al. | |
| 2014/0240178 A1 | 8/2014 | Chun et al. | |
| 2014/0273590 A1* | 9/2014 | Sharma ................ | G06F 1/1656 439/350 |
| 2016/0342225 A1* | 11/2016 | Birecki ................ | G09G 3/344 |
| 2018/0358684 A1 | 12/2018 | Chun et al. | |
| 2019/0036067 A1* | 1/2019 | Kim ................... | H01L 51/5237 |
| 2019/0317550 A1 | 10/2019 | Kim et al. | |
| 2019/0319416 A1* | 10/2019 | Zhang .................. | H01R 39/10 |
| 2020/0196460 A1* | 6/2020 | Myers ................. | G06F 1/1652 |
| 2020/0267838 A1 | 8/2020 | An et al. | |

FOREIGN PATENT DOCUMENTS

| | | | |
|---|---|---|---|
| JP | 2007024157 A | 2/2007 | |
| JP | 2007245794 A | 9/2007 | |
| JP | 2008306515 A | 12/2008 | |
| JP | 2011123879 A | 6/2011 | |
| JP | 2017168127 A | 9/2017 | |
| JP | 2020503589 A | 1/2020 | |
| KR | 10-2002-0079852 A | 10/2002 | |
| KR | 10-2006-0068927 A | 6/2006 | |
| KR | 10-2014-0105886 A | 9/2014 | |
| KR | 10-2016-0128701 A | 11/2016 | |
| KR | 10-2019-0094412 A | 8/2019 | |
| KR | 10-2019-0119719 A | 10/2019 | |
| KR | 10-2020-0101116 A | 8/2020 | |

OTHER PUBLICATIONS

Korean Decision to Grant dated May 11, 2021, issued in Korean Application No. 10-2020-0142197.
Korean Notice of Preliminary Exam dated Feb. 9, 2021, issued in Korean Application No. 10-2020-0142197.

* cited by examiner

ELECTRONIC DEVICE INCLUDING FLEXIBLE DISPLAY

CROSS-REFERENCE TO RELATED APPLICATION(S)

This application is based on and claims priority under 35 U.S.C. § 119(a) of a Korean patent application number 10-2020-0142197, filed on Oct. 29, 2020, in the Korean Intellectual Property Office, the disclosure of which is incorporated by reference herein in its entirety.

BACKGROUND

1. Field

The disclosure relates to an electronic device including a flexible display.

2. Description of Related Art

An electronic device including a flexible display has been introduced or developed. The electronic device may have the form (a foldable electronic device) in which a housing is folded around a hinge or the form (a rollable electronic device) in which the flexible display is unfolded or received inside the housing while being bent.

The rollable electronic device may be used in the form of a tablet personal computer (PC) through an expanded display when the display is unfolded. The rollable electronic device may be used in the form of a typical smartphone and may have an enhanced portability, when the display is received inside while being bent.

The above information is presented as background information only to assist with an understanding of the disclosure. No determination has been made, and no assertion is made, as to whether any of the above might be applicable as prior art with regard to the disclosure.

SUMMARY

When at least a portion of the housing and a flexible display are moved, the electronic device may use a flexible printed circuit board (FPCB), a c-clip, or a pogo pin such that the at least the portion of the housing maintains the contact with a surrounding component. In this case, the contact structure may be deformed due to friction, or the FPCB, the c-clip, or the pogo may not be applied to the rollable electronic device due to spatial constrains.

Aspects of the disclosure are to address at least the above-mentioned problems and/or disadvantages and to provide at least the advantages described below. Accordingly, an aspect of the disclosure is to provide an electronic device including a rotary contact structure in which at least a portion of the electronic device including a flexible display maintains contact with a sliding housing to correspond to a slide-in operation or a slide-out operation.

Additional aspects will be set forth in part in the description which follows and, in part, will be apparent from the description, or may be learned by practice of the presented embodiments.

In accordance with an aspect of the disclosure, an electronic device is provided. The electronic device includes a flexible display, a first housing moving corresponding to change in a shape of the flexible display and including a contact region, a second housing sliding in a direction opposite to a direction in which the first housing moves of the first housing and to mount the flexible display, a rotary contact structure making contact with the contact region, and a printed circuit board (PCB) electrically connected with the at least one rotary contact structure. The at least one rotary contact structure may include a rotating part maintaining contact with the contact region while rotating in a process of changing a shape of the flexible display, a central part disposed inside the rotating part, a conductive member interposed between the rotating part and the central part, and a support part supporting the central part and electrically connecting the central part with the PCB.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
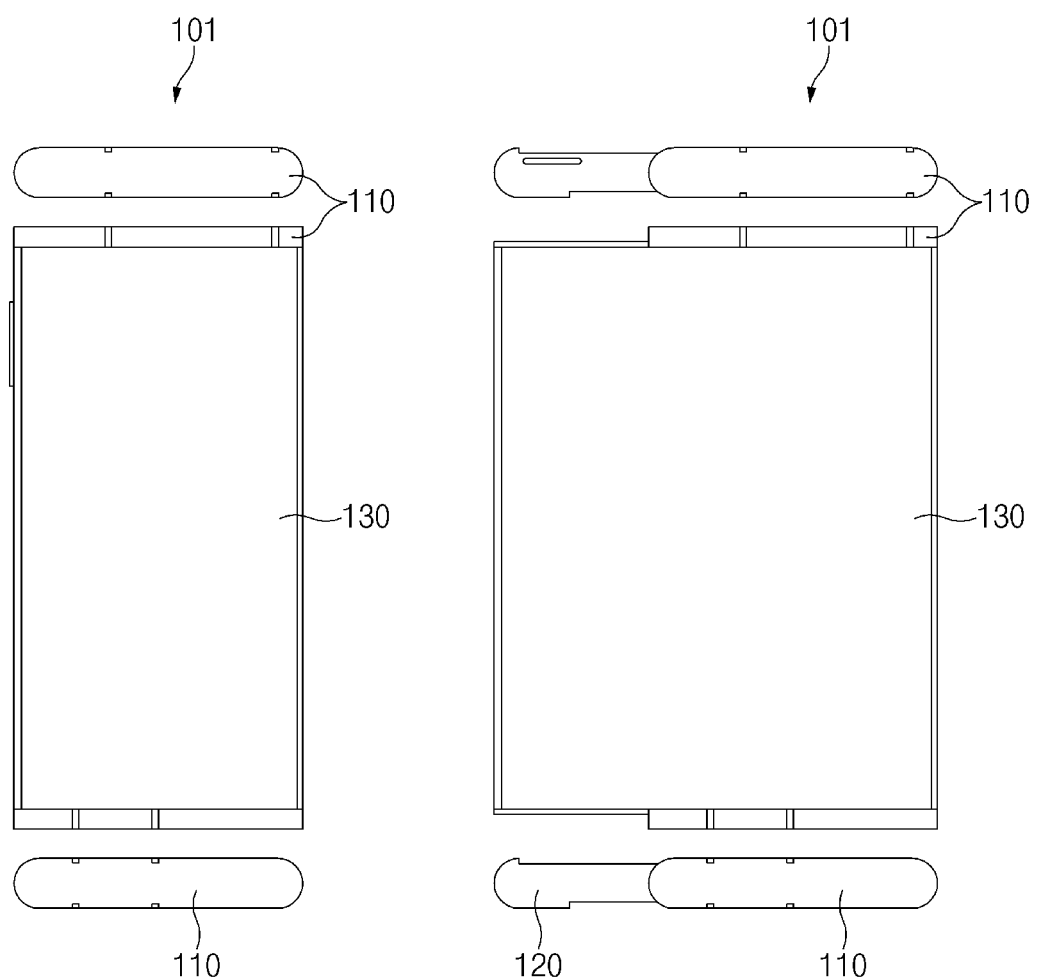
FIG. 1 illustrates an electronic device, according to an embodiment of the disclosure.

FIG. 1 illustrates an electronic device, according to an embodiment of the disclosure.

Referring to FIG. 1, an electronic device 101 may include a first housing 110, a second housing 120, and a flexible display 130.

The first housing 110 may function as a stationary cover to which one side of the flexible display 130 is fixed. When the flexible display 130 is unfolded, the first housing 110 may be in a stationary status or may move in an opposite to a direction in which the flexible display 130 is unfolded.

The second housing 120 may function as a movable cover to which another side of the flexible display 130 is fixed. When the flexible display 130 is unfolded, the second housing 120 may move in a direction the same as the direction in which the flexible display 130 moves.

The flexible display 130 may be received in the first housing 110 while being at least partially bent. When the flexible display 130 is received, the first housing 110 and the second housing 120 may be disposed to overlap with each other, and the minimum area of the flexible display 130 may be exposed to the outside. In this case, the electronic device 101 may be used in the form of a bar-type smartphone.

When the flexible display 130 is unfolded to the maximum extent (hereinafter, a fully unfolded status), the movement of the second housing 120 is complemented in a direction in which the flexible display 130 is expanded. In the fully unfolded status, the overlap part between the first housing 110 and the second housing 120 may be minimized. In the fully unfolded status, a display region of the flexible display 130 may be exposed to the maximum extent, and the electronic device 101 may be used in the form of a tablet PC.

Although not illustrated in FIG. 1, the flexible display 130 may be used while being partially unfolded (hereinafter, a partially unfolded status). In the partially unfolded status, the display region of the flexible display 130 may be larger than a display region of the flexible display 130 which is received (hereinafter, a received status), and may be smaller than a display region of the flexible display 130 in the fully unfolded status.

Figure 2:
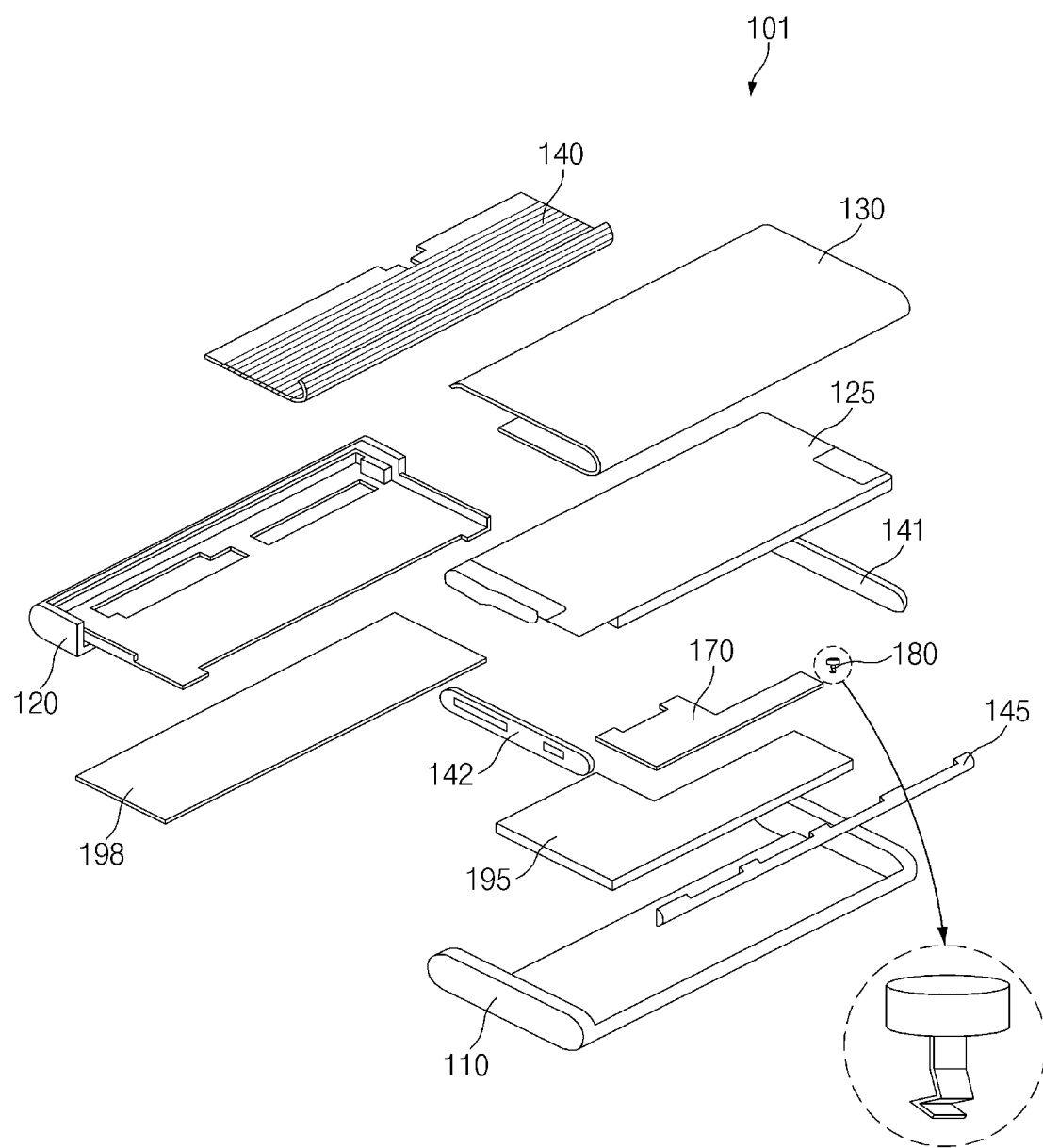
FIG. 2 is an exploded perspective view of an electronic device, according to an embodiment of the disclosure.

FIG. 2 is an exploded perspective view of an electronic device, according to an embodiment of the disclosure.

Referring to FIG. 2, the electronic device 101 may include the first housing 110, the second housing 120, an inner housing 125, the flexible display 130, a display support part 140, a first rail 141, a second rail 142, a roller 145, a printed circuit board 170, a rotary contact structure 180, a battery 195, and a back cover 198.

The first housing 110 may function as a stationary cover to which one side of the flexible display 130 is fixed. The first housing 110 may cover a rear surface of the electronic device 101 and remaining side surfaces of the flexible display 130, other than an expanded side surface of the flexible display 130. The first housing 110 may fix the first rail 141 and the second rail 142 to move the flexible display 130.

Figure 3:
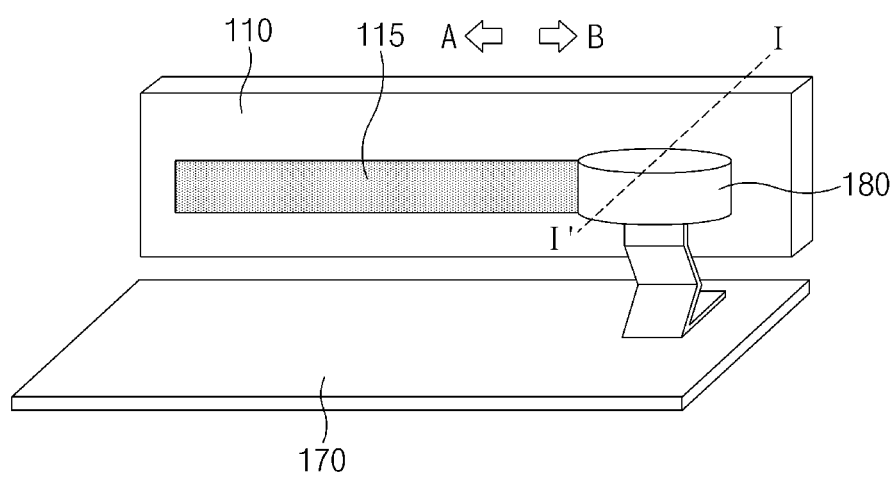
FIG. 3 illustrates a contact between a contact pattern of a first housing and a rotary contact structure, according to an embodiment of the disclosure.
Figure 9:
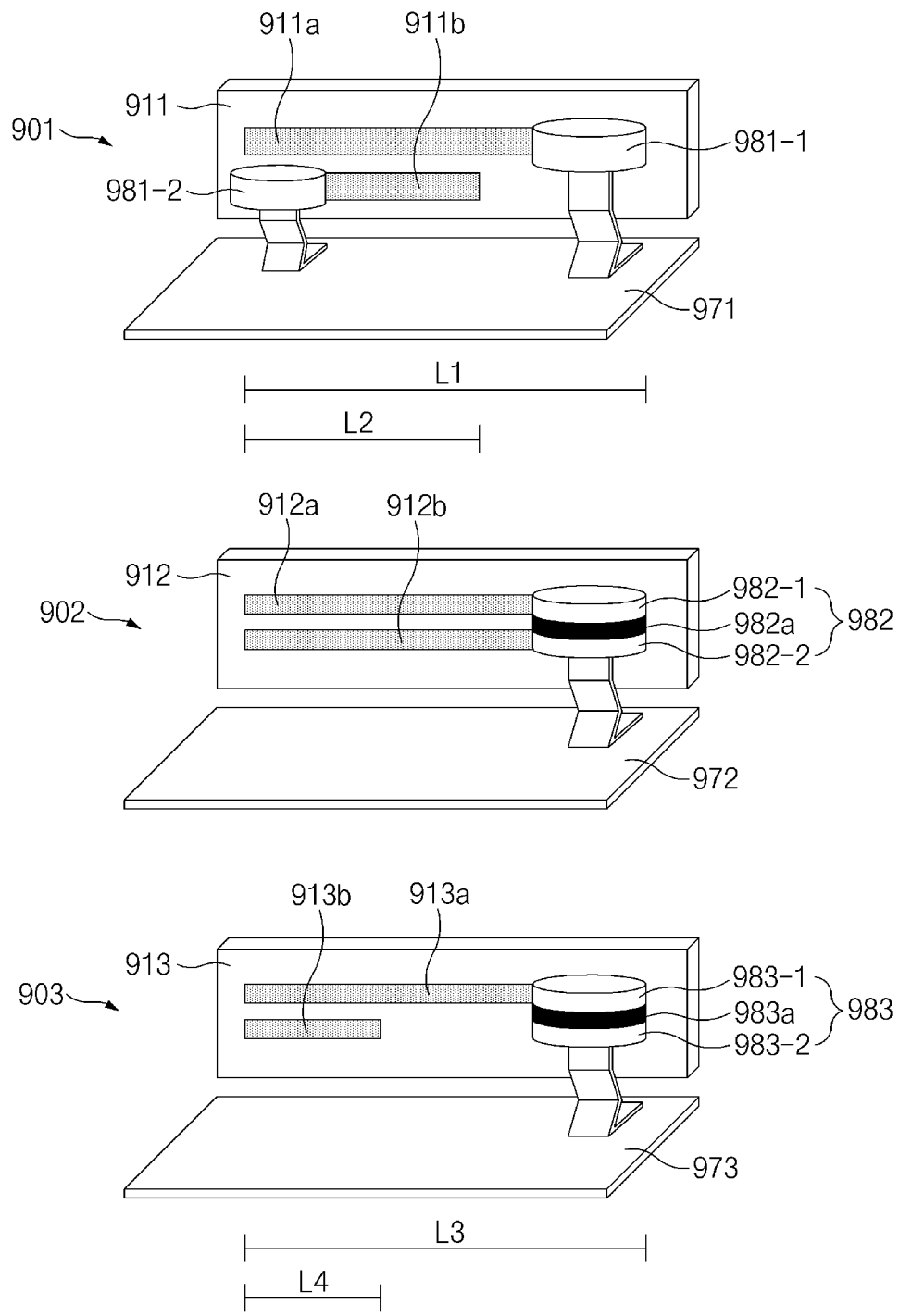
FIG. 9 illustrates arrangement of a plurality of contact regions, according to an embodiment of the disclosure.

The first housing 110 may include a contact region (or a contact pattern) formed on an inner surface thereof and electrically connected with the rotary contact structure 180 (see FIG. 3 or 9). According to an embodiment, when the electronic device 101 is in the fully unfolded status, the partially unfolded status, or the received status, the contact region of the first housing 110 may maintain the contact with the rotary contact structure 180 (see FIG. 3).

According to an embodiment, at least a portion of the first housing 110 may include a conductive material, and may be used as an antenna radiator. A signal transmitted or received through the first housing 110 may be transmitted to a wireless communication circuit inside the electronic device 101 through the rotary contact structure 180.

The second housing 120 may function as a movable cover to which another side of the flexible display 130 is fixed. When the flexible display 130 is unfolded, the second housing 120 may move in the direction the same as the direction in which the flexible display 130 moves. The second housing 120 may be coupled to the inner housing 125.

The inner housing (or a front cover, a bracket, a third housing) 125 may support the flexible display 130. When the flexible display 130 is unfolded or received, the inner housing 125 may move in the direction the same as the direction in which the flexible display 130 moves. The display support part 140, the printed circuit board (PCB) 170, and various components (e.g., a camera module or a sensor module) may be positioned on the inner housing 125.

The flexible display (or the rollable display) 130 may display content such as a text or an image. In the received status, the flexible display 130 may be received in the electronic device 101 while being bent or wound. In this case, the display region, which displays the content, of the flexible display 130, may be smaller than the display region of the flexible display 130 withdrawn and expanded from the electronic device 101. The display region, which displays the content, of the expanded flexible display 130, may be larger than the display region of the flexible display 130 received in the electronic device 101.

The display support part (e.g., the multi-bar) 140 may be in a structure in which a plurality of bars are arranged at regular distances in parallel to each other. The display support part 140 may be interposed between the flexible display 130 and the inner housing 125. The display support part 140 may be coupled to each of the flexible display 130 and the inner housing 125 through separate adhesive members.

The display support part 140 may include a rack gear provided at an end portion thereof and coupled to the first rail 141 or the second rail 142 to operate. The display support part 140 is maintained in a specified curve shape in a region in which the flexible display 130 is bent, thereby preventing the flexible display 130 from being broken.

The first rail 141 and the second rail 142 may guide the movement of the display support part 140. The first rail 141 may be coupled to a first portion (upper portion) of the first housing 110, and the second rail 142 may be coupled to a second portion (lower portion) of the first housing 110. The first rail 141 and the second rail 142 may function as bases to be assembled to the rack gear of the display support part 140.

The roller 145 may reduce the friction with the display support part 140 and may support bars constituting the display support part 140.

The printed circuit board 170 may have various electronic parts mounted on the printed circuit board 170 and necessary for driving the electronic device 101. For example, the printed circuit board 170 may have various electronic components, such as a processor, a memory, and a communication circuit mounted, which are mounted on the printed circuit board 170.

According to an embodiment, the printed circuit board 170 may have the rotary contact structure 180 mounted on the printed circuit board 170. In the received status, the partially unfolded status or the fully unfolded status, the printed circuit board 170 may maintain the electrical connection with the contact region of the first housing 110 through the rotary contact structure 180.

The rotary contact structure 180 may electrically connect the printed circuit board 170 with the contact region of the first housing 110. When the flexible display 130 is unfolded or received, the rotary contact structure 180 may maintain the contact status with the contact region of the first housing 110 while rotating (see FIG. 3).

The battery 195 may supply power necessary for the operation of the electronic device 101. The battery 195 may be received in the first housing 110 and may be electrically connected with the printed circuit board 170.

The back cover 198 may cover a hole formed in the second housing 120. The hole may be formed to assemble the electronic device 101.

FIG. 3 illustrates the contact between a contact region of a first housing and a rotary contact structure, according to an embodiment of the disclosure.

Referring to FIG. 3, the rotary contact structure 180 may electrically connect a contact region (or the contact pattern) 115 of the first housing (or the sliding housing) 110 with the printed circuit board 170. The rotary contact structure 180 may be fixed to and electrically connected with the printed circuit board 170.

The first housing 110 may include the contact region 115. The contact region 115 may contact the rotary contact structure 180. The contact region 115 may be in the form of a rod extending in the direction in which the first housing 100 moves (e.g., a first direction "A" or a second direction "B") of the first housing. According to an embodiment, the contact region 115 may be a contact point (e.g., a feeding point or a grounding point) allowing at least a portion of the first housing 110 to serve as an antenna radiator.

According to various embodiments, the contact region 115 may have an elastic structure. In this case, the contact region 115 may easily make contact with the rotary contact structure 180 due to the elastic force of the contact region 115. For example, the contact region 115 may be a spring structure protruding toward the rotary contact structure 180.

According to various embodiments, when the first housing 110 linearly moves in the first direction "A" or the second direction "B", the rotary contact structure 180 may maintain the contact with the contact region 115 while rotating counterclockwise or clockwise. For example, the first direction "A" may be a direction in which the flexible display 130 is unfolded, and the second direction "B" may be a direction in which the flexible display 130 is received.

Figure 4:
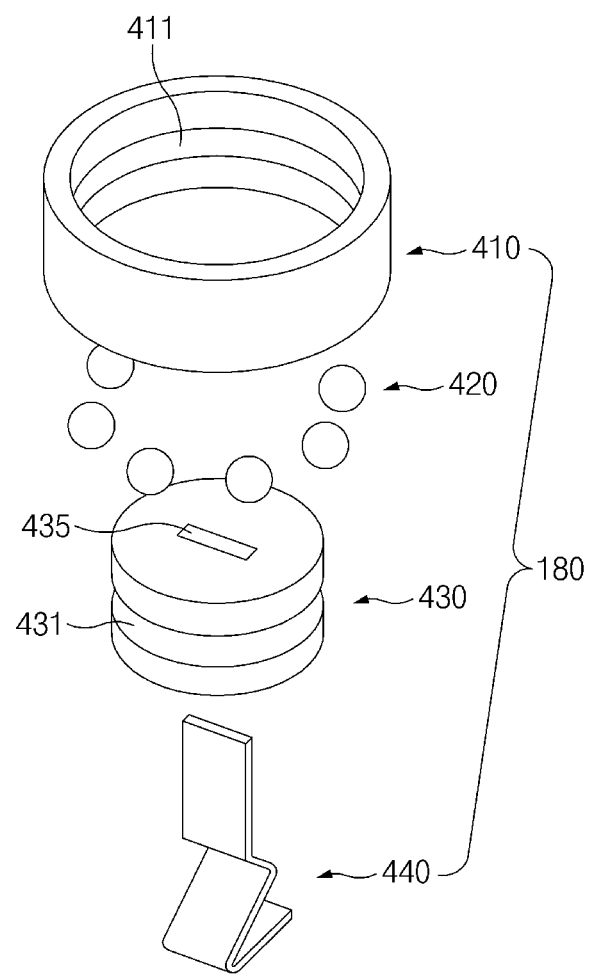
FIG. 4 is an exploded perspective view of a rotary contact structure, according to an embodiment of the disclosure.

FIG. 4 is an exploded perspective view of a rotary contact structure, according to an embodiment of the disclosure.

Figure 5:
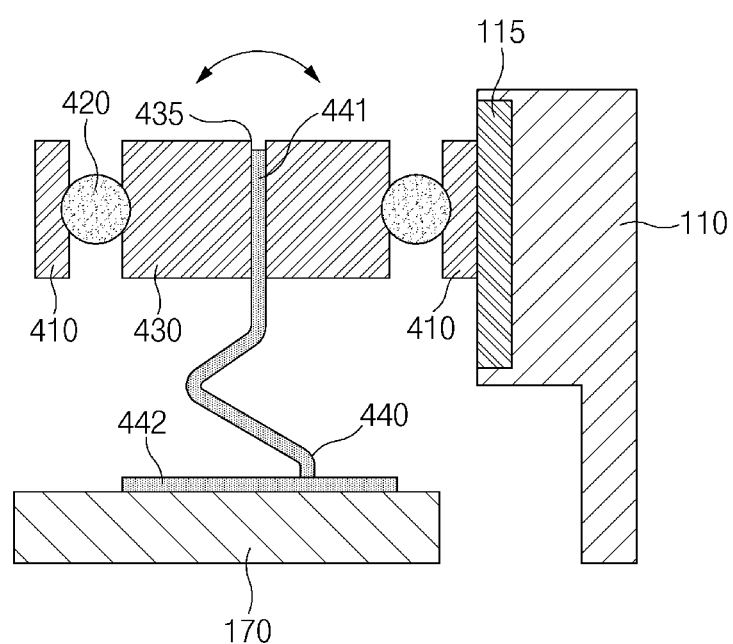
FIG. 5 is a sectional view of a rotary contact structure, according to an embodiment of the disclosure.

FIG. 5 is a sectional view of a rotary contact structure taken along line I-I' of FIG. 3, according to an embodiment of the disclosure.

Referring to FIGS. 4 and 5, the rotary contact structure 180 may include a rotating part (or outer ring) 410, a conductive member (or a conductive bearing, a conductive circular structure, or a conductive ball) 420, a central part (or an inner ring) 430, and a support part (or a support shaft) 440.

The rotating part (or the outer ring) 410 may rotate while making contact with the contact region 115. The contact region 115 may linearly move to correspond to change in the shape (the received status, the partially unfolded status, or the fully unfolded status) of the electronic device 101, and the rotating part 410 may maintain contact with the contact region 115 through the rotation movement.

According to an embodiment, the rotating part 410 may include a first guide 411 which is formed on an inner surface of the rotating part 410 to provide a path allowing the conductive member 420 to move or rotate.

The conductive member 420 may be interposed between the rotating part 410 and the central part 430. The conductive member 420 may reduce friction, which may occur due to rotation of the rotating part 410, by movement or rotation. The conductive member 420 may be at least partially realized with a conductive material, and may electrically connect the rotating part 410 with the central part 430.

According to an embodiment, the conductive member 420 may be realized with one material. For example, the conductive member 420 may include a plurality of metal balls (see FIG. 11).

According to another embodiment, the conductive member 420 may be realized with a plurality of materials. For example, the conductive member 420 may be in the form in which a metal ball having a conductive property and a ceramic ball are alternately arranged (see FIG. 12). Accordingly, the durability (abrasion resistance) of the conductive member 420 may be enhanced.

The central part (or inner ring) 430 may be disposed inside the rotating part 410. The central part 430 may be realized with a conductive material, and may be a contact part having a diameter smaller than a diameter of the rotating part 410. The central part 430 may be electrically connected with the rotating part 410 through the conductive member 420. When the rotating part 410 or the conductive member 420 rotates, the central part 430 may be in a stationary status without rotating.

According to an embodiment, the central part 430 may include a second guide 431 which is formed on an outer surface of the central part 430 to provide a path for allowing the conductive member 420 to move or rotate.

According to an embodiment, the central part 430 may include a hole (or an opening part) 435 to couple the central part 430 to the support part 440. Although FIG. 4 illustrates the shape of the hole 435, the disclosure is not limited thereto. For example, the central part 430 may include a groove formed in a surface facing the support part 440.

A first end 441 of the support part 440 may be inserted into and fixed to the hole 435 of the central part 430. A second end 442 of the support part 440 may be coupled to and fixed to the printed circuit board 170. The support part 440 may be realized with a conductive material. The support part 440 may be an elastic structure formed in an axial direction perpendicular to the rotating part 410. The support part 440 may be realized in a form having elasticity or with a material having elasticity. For example, the support part 440 may be bent similarly to a spring to have elastic force.

According to an embodiment, when external force is not applied, the support part 440 may allow the rotating part 410 or the central part 430 to maintain the contact with the contact region 115 at a specified angle (e.g., about 90 degrees).

According to an embodiment, when external force is applied to the electronic device 101 to change the structure of the electronic device 101 (depending on the received status, the partially unfolded status, or the fully unfolded status), the shape or the compression degree of the support part 440 may be varied.

The printed circuit board 170 may fix the second end 442 of the support part 440 to the printed circuit board 170 and may be electrically connected with the support part 440. The printed circuit board 170 may be electrically connected with the contact region 115 through the rotating part 410, the conductive member 420, the central part 430, and the support part 440.

Figure 6:
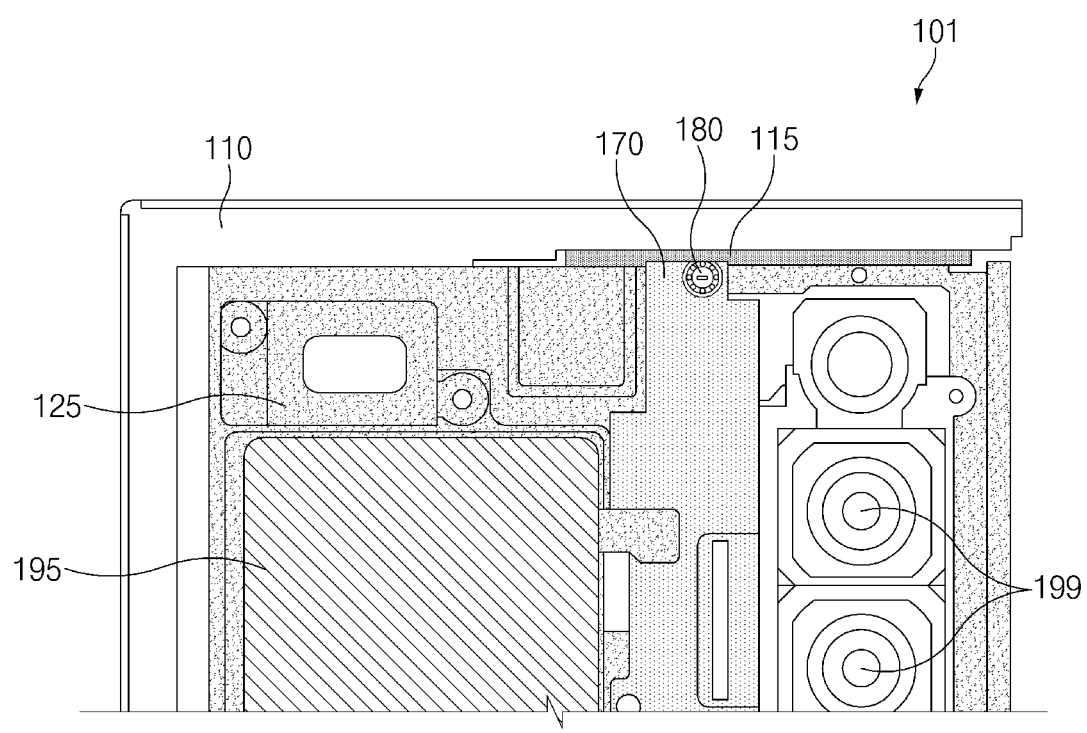
FIG. 6 illustrates a configuration of a rotary contact structure inside an electronic device, according to an embodiment of the disclosure.

FIG. 6 illustrates the configuration of a rotary contact structure inside an electronic device, according to an embodiment of the disclosure.

Referring to FIG. 6, the inner housing 125 may fix the printed circuit board 170 and various components (e.g., a camera module 199 or the sensor module). The printed circuit board 170 may have the rotary contact structure 180 mounted at a region (or at an end portion adjacent to the first housing 110) thereof adjacent to the first housing 110. The printed circuit board 170 may receive power from the battery 195.

The first housing 110 may include the contact region (or the contact pattern) 115. The contact region 115 may linearly move to correspond to the change in the structure of the electronic device 101 (depending on the received status, the partially unfolded status, or the fully unfolded status). The rotary contact structure 180 may maintain the contact with the contact region 115 while rotating to correspond to a linear movement distance of the contact region 115 (or the first housing 110).

Figure 7:
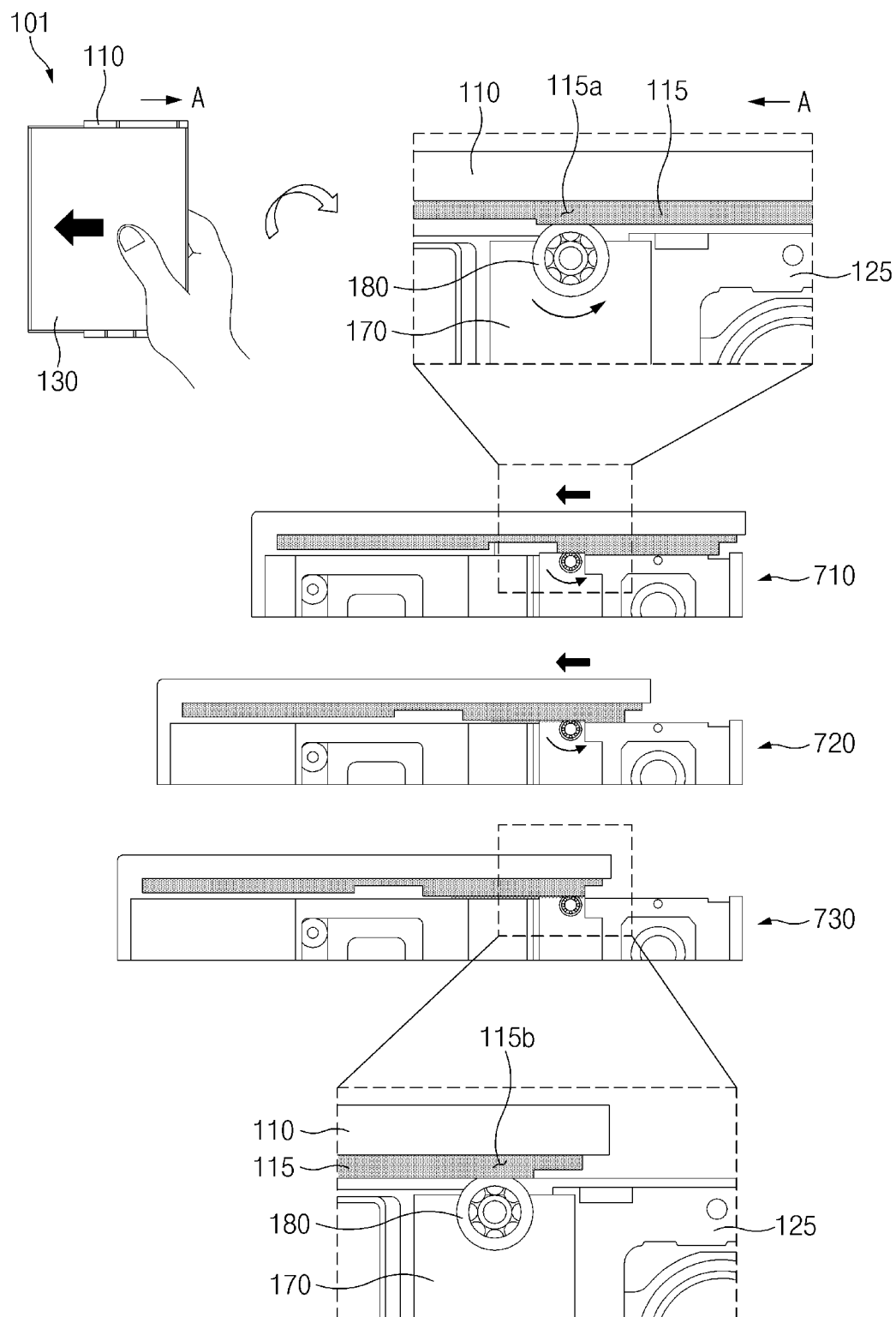
FIG. 7 illustrates a slide-out operation for a flexible display, according to an embodiment of the disclosure.

FIG. 7 illustrates a slide-out operation for a flexible display, according to an embodiment of the disclosure.

Referring to FIG. 7, when external force is applied to the flexible display 130 such that the flexible display 130 is withdrawn, the display region of the flexible display 130 is unfolded while being expanded, as the flexible display 130 is gradually withdrawn (slid) out of the first housing 110 (a slide-out operation). When the flexible display 130 undergoes the slide-out operation, the first housing (or the sliding housing) 110 may gradually move in the first direction "A" which is opposite to the direction in which the flexible display 130 is unfolded (or the first housing 110 does not move, and the inner housing 125, the printed circuit board 170, and the rotary contact structure 180 move in the direction opposite to the first direction "A").

The rotary contact structure 180 may be in the contact with a first point 115a of the contact region 115, in the state that the flexible display 130 is received in the first housing 110 before the flexible display 130 undergoes the slide-out operation at operation 710. When the second housing 120 and the flexible display 130 of the electronic device 101 undergo the slide-out operation, the rotary contact structure 180 may rotate counterclockwise to correspond to the linear movement of the contact region 115 in the first direction "A".

The rotary contact structure 180 may maintain the contact with one point between the first point 115a of the contact region 115 and a second point 115b of the contact region 115, in the state that the flexible display 130 partially undergoes the slide-out operation, that is, the flexible display 130 is partially unfolded at operation 720. When the slide-out operation is maintained, the rotary contact structure 180 may continuously rotate counterclockwise.

When the slide-out operation for the flexible display 130 is terminated, so the flexible display 130 is fully unfolded at operation 730, the rotary contact structure 180 may maintain the contact with the second point 115b of the contact region 115.

Figure 8:
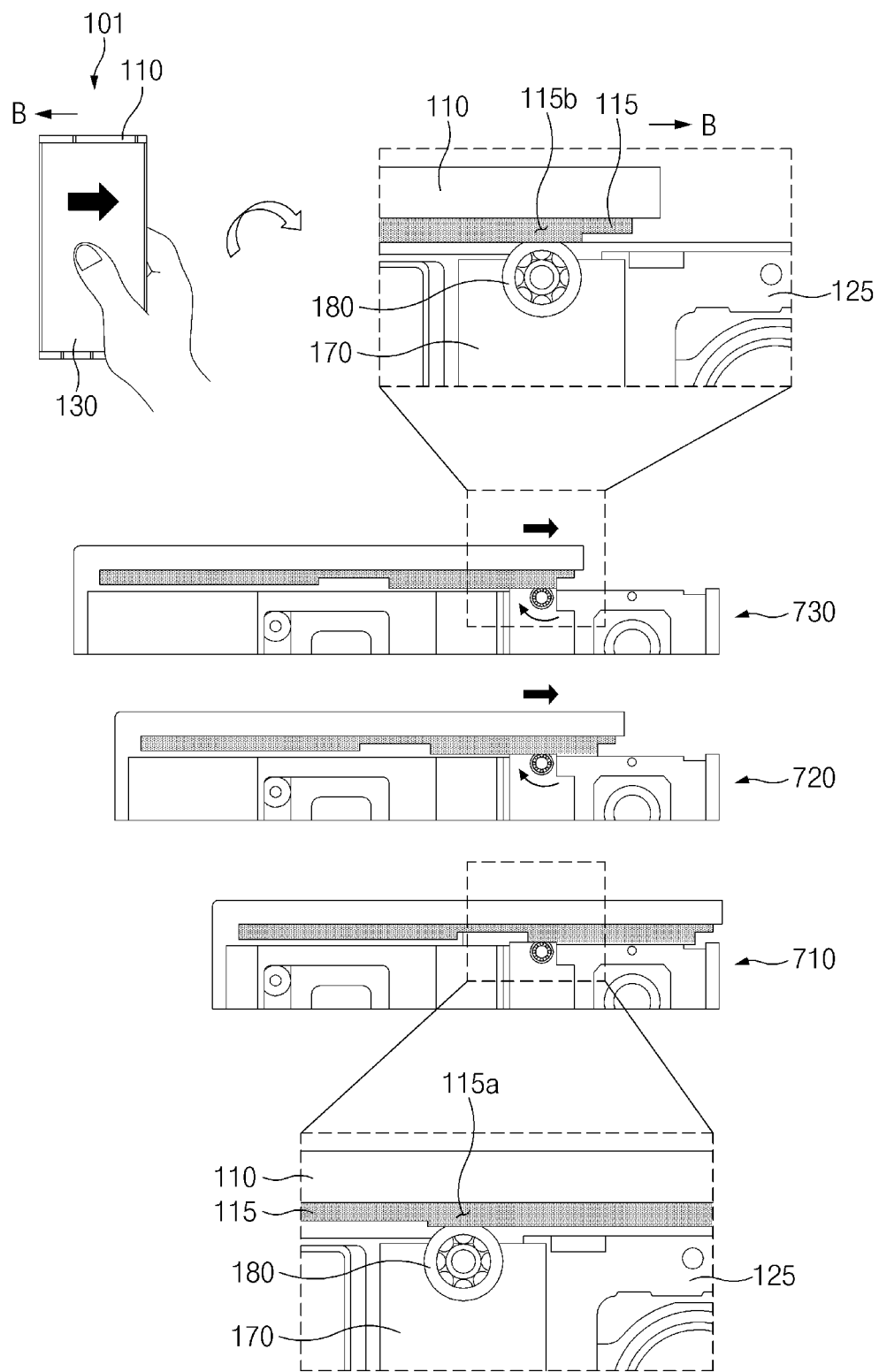
FIG. 8 illustrates a slide-in operation for a flexible display, according to an embodiment of the disclosure.

FIG. 8 illustrates a slide-in operation for a flexible display, according to an embodiment of the disclosure.

Referring to FIG. 8, when external force is applied to the flexible display 130 such that the flexible display 130 is introduced, the display region of the flexible display 130 may be reduced, as the flexible display 130 is gradually received (slid) into the first housing 110 (a slide-in operation). When the flexible display 130 undergoes the slide-in operation, the first housing (or the sliding housing) 110 may gradually move in the second direction "B" which is opposite to the direction in which the flexible display 130 is received (or the first housing 110 does not move, and the inner housing 125, the printed circuit board 170, and the rotary contact structure 180 move in the opposite direction to the second direction "B").

The rotary contact structure 180 may be in the contact with the second point 115b of the contact region 115, in the state that the flexible display 130 is fully unfolded at operation 730. When the flexible display 130 undergoes the slide-in operation, the rotary contact structure 180 may rotate clockwise to correspond to the linear movement of the contact region 115 in the second direction "B".

The rotary contact structure 180 may maintain the contact with one point between the first point 115a of the contact region 115 and the second point 115b of the contact region 115, in the state that the flexible display 130 partially undergoes the slide-in operation, that is, the flexible display 130 is partially unfolded at operation 720. When the slide-in operation is maintained, the rotary contact structure 180 may continuously rotate clockwise.

When the slide-in operation for the flexible display 130 is terminated, so the flexible display 130 is received at operation 710, the rotary contact structure 180 may be in the contact with the first point 115a of the contact region 115.

FIG. 9 illustrates arrangement of a plurality of contact regions, according to an embodiment of the disclosure. Although FIG. 9 illustrates that two contact regions are disposed on the inner surface of a first housing 911, 912, or 913, the disclosure is not limited thereto.

Referring to FIG. 9, a first rollable electronic device 901 may include a sliding housing (first housing) 911, a first rotary contact structure 981-1, a second rotary contact structure 981-2, and a printed circuit board 971. The first rollable electronic device 901 may be realized identically to or similarly to the electronic device 101.

The sliding housing 911 may include a first contact region 911a and a second contact region 911b. The first contact region 911a may make contact with the first rotary contact structure 981-1. The second contact region 911b may make contact with the second rotary contact structure 981-2.

According to an embodiment, the first contact region 911*a* and the second contact region 911*b* may have different lengths. For example, the first contact region 911*a* may have a first length "L1" and the second contact region 911*b* may have a second length "L2" shorter than the first length "L1".

According to various embodiments, time for which the first contact region 911*a* makes contact with the first rotary contact structure 981-1 may differ from time for which the second contact region 911*b* makes contact with the second rotary contact structure 981-2, depending on the change in the shape of the first rollable electronic device 901 (depending on the received status, the partially unfolded status, or the fully unfolded status).

The first contact region 911*a* may continuously make contact with the first rotary contact structure 981-1, depending on the change in the structure of the first rollable electronic device 901 (depending on the received status, the partially unfolded status, or the fully unfolded status). For example, when the first rotary contact structure 981-1 makes communication in a first frequency band, the first rollable electronic device 901 may continuously transmit or receive a signal of the first frequency band regardless the received status of the flexible display 130.

When the first rollable electronic device 901 is in the received status or the partially unfolded status, the second contact region 911*b* may maintain contact with the second rotary contact structure 981-2. When the first rollable electronic device 901 is in the fully unfolded status, the second contact region 911*b* may not maintain contact with the second rotary contact structure 981-2. For example, when the second rotary contact structure 981-2 makes communication in a second frequency band or a third frequency band, the first rollable electronic device 901 may transmit or receive a signal of the second frequency band through the second rotary contact structure 981-2 in the received status or the partially unfolded status, and may transmit or receive a signal in the third frequency band in the fully unfolded status.

Although FIG. 9 illustrates that the first rotary contact structure 981-1 and the second rotary contact structure 981-2 have different conduction statuses in the respective contact regions depending on the status of the electronic device resulting from the movement of the sliding housing 911, the first rotary contact structure 981-1 and the second rotary contact structure 981-2 may be disposed to rotate in the same direction.

According to various embodiments, a second rollable electronic device 902 may include a sliding housing 912, a rotary contact structure 982, and a printed circuit board 972. The second rollable electronic device 902 may be realized identically to or similarly to the electronic device 101.

The sliding housing 912 may include a first contact region 912*a* and a second contact region 912*b*. The rotary contact structure 982 may include a first rotating part 982-1, an insulating part 982*a*, and a second rotating part 982-2. The first contact region 912*a* may make contact with the first rotating part 982-1. The second contact region 912*b* may make contact with the second rotating part 982-2.

According to an embodiment, the insulating part 982*a* may be positioned between the first rotating part 982-1 and the second rotating part 982-2. The first rotating part 982-1 and the second rotating part 982-2 may independently make contact with the first contact region 912*a* and the second contact region 912*b*, respectively, while moving, due to the insulating part 982*a*.

According to an embodiment, the first contact region 912*a* and the second contact region 912*b* may have equal lengths. The first contact region 912*a* and the second contact region 912*b* may transmit and receive signals for performing different functions. For example, the first contact region 912*a* and the first rotating part 982-1 transmit and receive a signal of the first frequency band, and the second contact region 912*b* and the second rotating part 982-2 may transmit and receive a signal of the second frequency band.

According to various embodiments, the first contact region 912*a* may continuously maintain the contact with the first rotating part 982-1, and the second contact region 912*b* may continuously maintain the contact with the second rotating part 982-2, depending on the change in the structure of the second rollable electronic device 902 (depending on the received status, the partially unfolded status, or the fully unfolded status).

According to various embodiments, a third rollable electronic device 903 may include a sliding housing 913, a rotary contact structure 983, and a printed circuit board 973. The third rollable electronic device 903 may be realized identically to or similarly to the electronic device 101.

The sliding housing 913 may include a first contact region 913*a* and a second contact region 913*b*. The rotary contact structure 983 may include a first rotating part 983-1, an insulating part 983*a*, and a second rotating part 983-2. The first contact region 913*a* may make contact with the first rotating part 983-1. The second contact region 913*b* may make contact with the second rotating part 983-2.

According to an embodiment, the insulating part 983*a* may be interposed between the first rotating part 983-1 and the second rotating part 983-2. The first rotating part 983-1 and the second rotating part 983-2 may independently make contact with the first contact region 913*a* and the second contact region 913*b*, respectively, while moving, due to the insulating part 983*a*.

According to an embodiment, the first contact region 913*a* and the second contact region 913*b* may have different lengths. For example, the first contact region 913*a* may have a first length "L3" and the second contact region 913*b* may have a second length "L4" shorter than the first length "L3".

The first contact region 913*a* and the second contact region 913*b* may transmit and receive signals for performing different functions. For example, the first contact region 913*a* and the first rotating part 983-1 transmit and receive a signal associated with the operation of the antenna, and the second contact region 913*b* and the second rotating part 983-2 may transmit and receive a signal associated with the operation of a display. For example, the first contact region 913*a* and the first rotating part 983-1 make communication in the first frequency band, and the second contact region 913*b* and the second rotating part 983-2 may make communication in the second frequency band.

According to various embodiments, the first contact region 913*a* may continuously maintain the contact with the first rotating part 983-1, and the second contact region 913*b* may maintain the contact with the second rotating part 983-2 for a specific time and may not maintain the contact with the second rotating part 983-2 for another specific time, depending on the change in the structure of the third rollable electronic device 903 (depending on the received status, the partially unfolded status, or the fully unfolded status).

Figure 10:
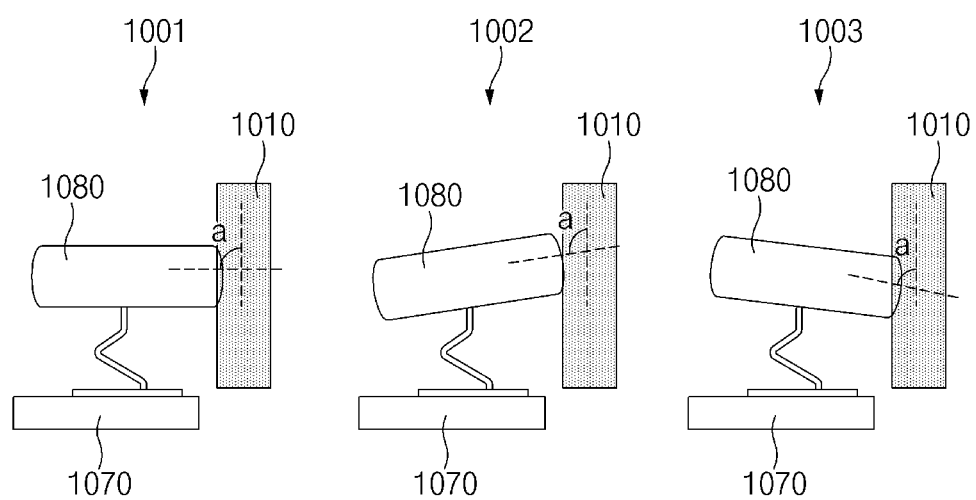
FIG. 10 illustrates a rotary contact structure having a curved contact surface, according to an embodiment of the disclosure.

FIG. 10 illustrates a rotary contact structure having a curved contact surface, according to an embodiment of the disclosure.

Referring to FIG. 10, a rotary contact structure 1080 may electrically connect a printed circuit board 1070 with a contact region 1010 of a sliding housing. The rotary contact structure 1080 may have a curved contact surface. Accordingly, the rotary contact structure 1080 may stably maintain the contact status with the contact region 1010 to correspond to the change in the structure of an electronic device (to correspond to the received status, the partially unfolded status, or the fully unfolded status).

For example, when the structure of the electronic device is changed (to be in the received status, the partially unfolded status, or the fully unfolded status), the contact angle ("a") between a rotating part of the rotary contact structure 1080 and the contact region 1010 may be variously changed. The rotary contact structure 1080 may stably maintain the contact with the contact region 1010 to correspond to various pressing statuses, such as a first status 1001 in which the contact angle "a" is a right angle, a second status 1002 in which the contact angle "a" is an obtuse angle, or a third status 1003 in which the contact angle "a" is an acute angle. When an assembly tolerance is present between parts, a stable contact between the rotating part of the rotary contact structure 1080 and the contact region 1010 may be maintained.

Figure 11:
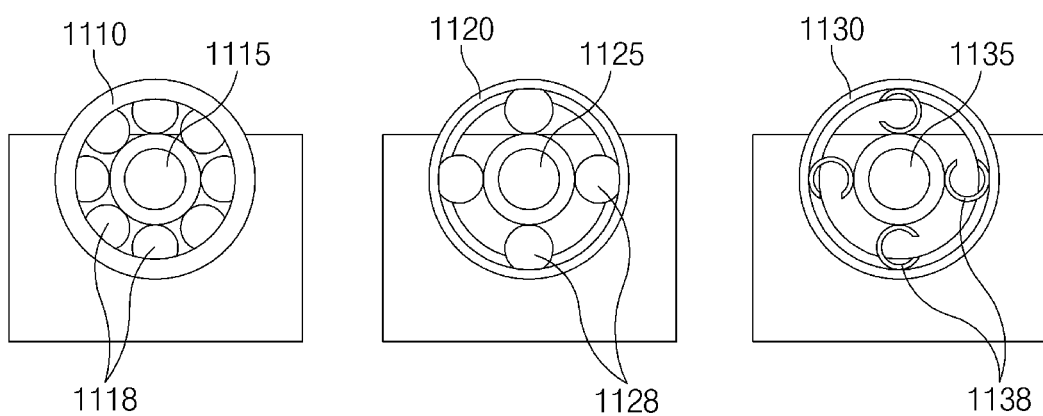
FIG. 11 illustrates various types of conductive members, according to an embodiment of the disclosure.

FIG. 11 illustrates various types of conductive members, according to an embodiment of the disclosure.

Referring to FIG. 11, conductive members (such as conductive bearings, conductive circular structures, or a conductive balls) interposed between rotating parts 1110, 1120, and 1130 and central parts 1115, 1125, and 1135 of the rotary contact structure may be realized with various conductive materials.

For example, the conductive members may be realized with a plurality of metal balls 1118 arranged at uniform distances (bearing structures). Although FIG. 11 illustrates that eight metal balls 1118 are arranged at uniform distances, the disclosure is not limited thereto.

For another example, the conductive members may be realized with a plurality of conductive rubbers (or a plurality of conductive sponges) 1128 disposed at uniform distances. The conductive rubbers 1128 may more easily absorb an impact and may reduce a friction or a sound, as compared to the plurality of metal balls 1118. Although FIG. 11 illustrates that four conductive rubbers 1128 are arranged at uniform distances, the disclosure is not limited thereto.

For another example, the conductive members may be realized with a plurality of leaf springs 1138 arranged at uniform distances. The leaf springs 1138 may be lighter than the plurality of metal balls 1118, and may rotate more rapidly than the plurality of metal balls 1118. Although FIG. 11 illustrates that four leaf springs 1138 are arranged at uniform distances, the disclosure is not limited thereto.

According to various embodiments, a material (e.g., thermal grease) for securing lubricity may be coated on an inner part of the conductive member.

Figure 12:
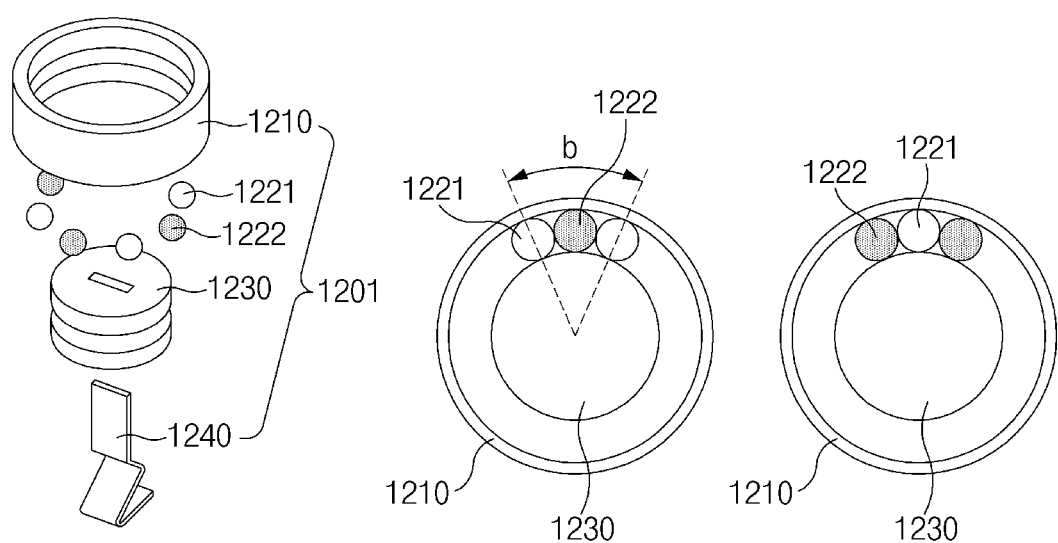
FIG. 12 illustrates that a conductive ball and a non-conductive ball are mixed and arranged, according to an embodiment of the disclosure.

FIG. 12 illustrates that a conductive ball and a non-conductive ball are mixed and arranged, according to an embodiment of the disclosure.

Referring to FIG. 12, a rotary contact structure 1201 may include a rotating part 1210, conductive members 1221 and 1222, a central part 1230, and a support part 1240.

According to an embodiment, the conductive members 1221 and 1222 may include a first type ball 1221 realized with a first material (e.g., a ceramic) and a second type ball 1222 realized with a second material (e.g., metal). When the first type ball 1221 and the second type ball 1222 are alternately arranged, the durability (abrasion resistance) of the conductive members 1221 and 1222 may be enhanced.

The first type ball 1221 and the second type ball 1222 may be alternately arranged between the rotating part 1210 and the central part 1230. When the first type ball 1221 is interposed between second type balls 1222, noise caused by the rotation or the movement of the rotating part 1210 or the conductive members 1221 and 1222 may be reduced, and the durability against the abrasion of the conductive members 1221 and 1222 may be enhanced.

According to an embodiment, the first type ball 1221 and the second type ball 1222 may be arranged in specific number at less than a specified arrangement angle "b". For example, when the arrangement angle is 30 degrees, one first type ball 1221 and one second type ball 1222 may be arranged at less than the arrangement angle "b". Accordingly, even if abrasion is caused by the friction between the conductive members 1221 and 1222, stable electrical connection may be maintained.

Figure 13A:
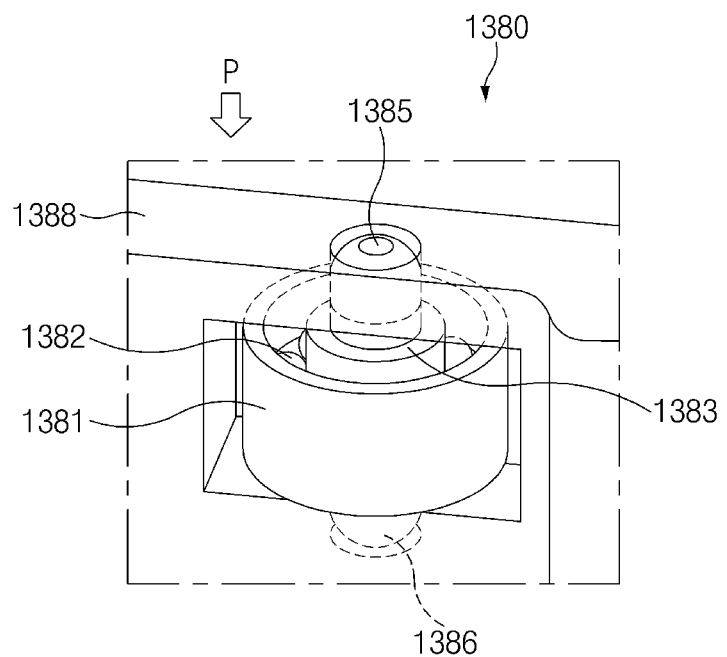
FIG. 13A illustrates a rotary contact structure having a fixed-type support structure, according to an embodiment of the disclosure.

FIG. 13A illustrates a rotary contact structure having a fixed-type support structure, according to an embodiment of the disclosure.

Figure 13B:
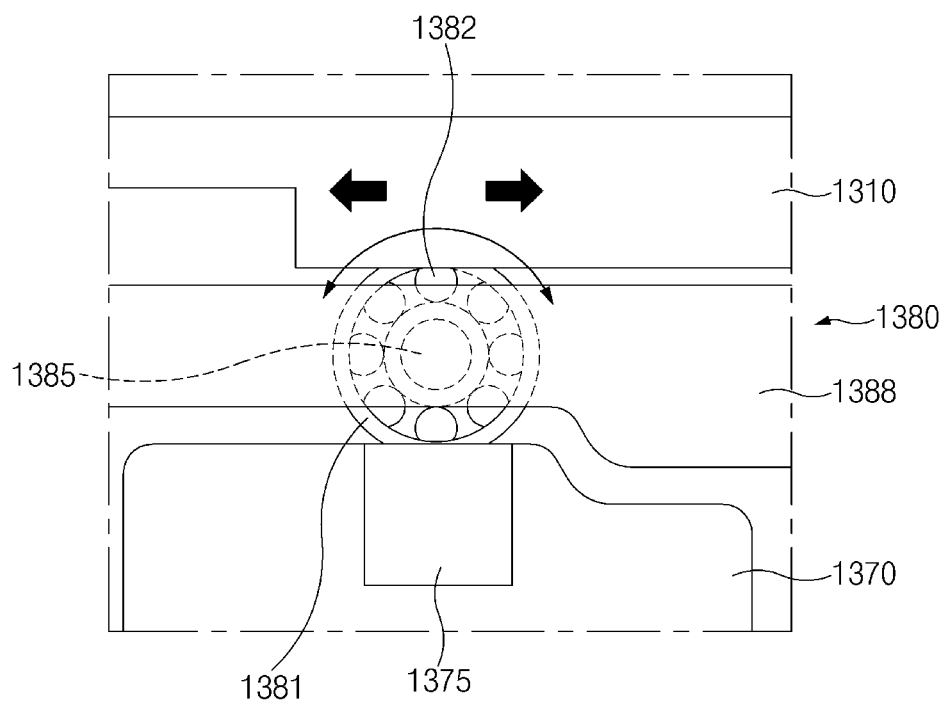
FIG. 13B is a view illustrating a shape of a rotary contact structure when the rotary contact structure of FIG. 13A is viewed in a direction "P"; according to an embodiment of the disclosure.

FIG. 13B is a view illustrating a shape of a rotary contact structure when the rotary contact structure of FIG. 13A is viewed in a direction "P", according to an embodiment of the disclosure.

Referring to FIGS. 13A and 13B, a rotary contact structure 1380 may electrically connect a printed circuit board 1370 with a sliding housing 1310. The rotary contact structure 1380 may include a rotating part 1381, a conductive member (or a plurality of conductive balls) 1382, a central part 1383, a first support part 1385, a second support part 1386, and a support structure 1388.

The first support part 1385 and the second support part 1386 may be interposed between the central part 1383 and the support structure 1388, respectively. According to an embodiment, the first support part 1385 and the second support part 1386 may be separately formed or may be integrally formed through the central part 1383. The first support part 1385 and the second support part 1386 may fix the central part 1383 to the support structure 1388.

The rotary contact structure 1380 may be fixed through a separate support structure 1388 without being directly fixed to the printed circuit board 1370. The support structure 1388 may be interposed between a contact region 1375 of the printed circuit board 1370 and the sliding housing 1310. The support structure 1388 may support the rotating part 1381 such that the rotating part 1381 rotates in a fixed position.

When the sliding housing 1310 linearly moves in a first direction (direction "A") or a second direction (direction "B") to correspond to the change (the received status, the partially unfolded status, or the fully unfolded status) in the structure of the electronic device, the rotating part 1381 may maintain the contact status with the sliding housing 1310 while rotating counterclockwise or clockwise.

Figure 14:
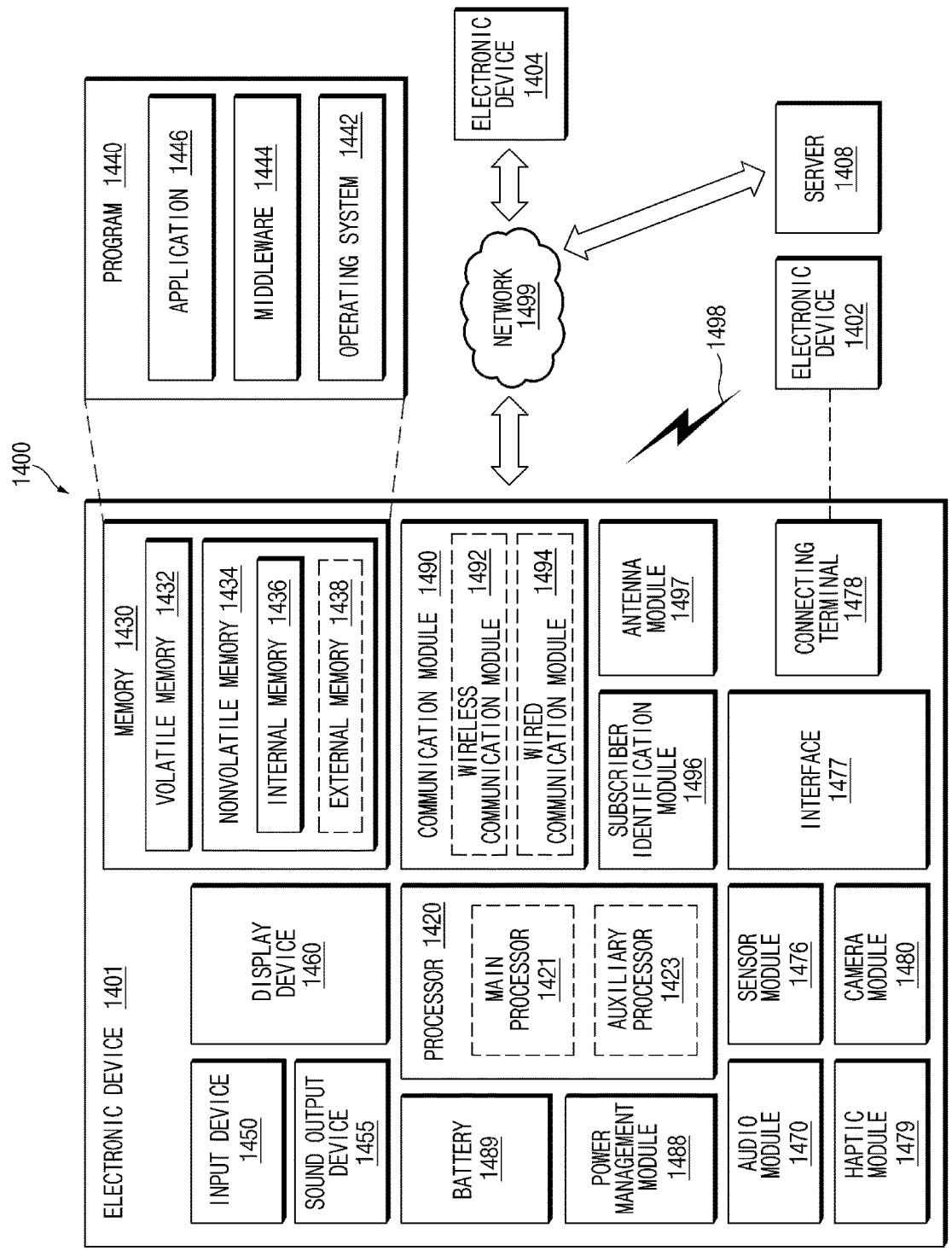
FIG. 14 is a block diagram of an electronic device under a network environment according to an embodiment of the disclosure.

FIG. 14 is a block diagram illustrating an electronic device in a network environment according to an embodiment of the disclosure.

Referring to FIG. 14, an electronic device 1401 in a network environment 1400 may communicate with an electronic device 1402 via a first network 1498 (e.g., a short-range wireless communication network), or at least one of an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input module 1450, a sound output module 1455, a display module 1460, an audio module 1470, a sensor module 1476, an interface 1477, a connecting terminal 1478, a haptic module 1479, a camera module 1480, a power management module 1488, a battery 1489, a communication module 1490, a subscriber identification module (SIM) 1496, or an antenna module 1497. In some embodiments, at least one of the components (e.g., the connecting terminal 1478) may be omitted from the electronic device 1401, or one or more other components may be added in the electronic device 1401. In some embodiments, some of the components (e.g., the sensor module 1476, the camera module 1480, or the antenna module 1497) may be implemented as a single component (e.g., the display module 1460).

The processor 1420 may execute, for example, software (e.g., a program 1440) to control at least one other component (e.g., a hardware or software component) of the electronic device 1401 coupled with the processor 1420, and may perform various data processing or computation. According to one embodiment, as at least part of the data processing or computation, the processor 1420 may store a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), or an auxiliary processor 1423 (e.g., a graphics processing unit (GPU), a neural processing unit (NPU), an image signal processor (ISP), a sensor hub processor, or a communication processor (CP)) that is operable independently from, or in conjunction with, the main processor 1421. For example, when the electronic device 1401 includes the main processor 1421 and the auxiliary processor 1423, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display module 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423. According to an embodiment, the auxiliary processor 1423 (e.g., the neural processing unit) may include a hardware structure specified for artificial intelligence model processing. An artificial intelligence model may be generated by machine learning. Such learning may be performed, e.g., by the electronic device 1401 where the artificial intelligence is performed or via a separate server (e.g., the server 1408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1430 may store various data used by at least one component (e.g., the processor 1420 or the sensor module 1476) of the electronic device 1401. The various data may include, for example, software (e.g., the program 1440) and input data or output data for a command related thererto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input module 1450 may receive a command or data to be used by another component (e.g., the processor 1420) of the electronic device 1401, from the outside (e.g., a user) of the electronic device 1401. The input module 1450 may include, for example, a microphone, a mouse, a keyboard, a key (e.g., a button), or a digital pen (e.g., a stylus pen).

The sound output module 1455 may output sound signals to the outside of the electronic device 1401. The sound output module 1455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1460 may visually provide information to the outside (e.g., a user) of the electronic device 1401. The display module 1460 may include, for example, a display, a hologram device, or a projector and control circuitry to control a corresponding one of the display, hologram device, and projector. According to an embodiment, the display module 1460 may include a touch sensor adapted to detect a touch, or a pressure sensor adapted to measure the intensity of force incurred by the touch.

The audio module 1470 may convert a sound into an electrical signal and vice versa. According to an embodiment, the audio module 1470 may obtain the sound via the input module 1450, or output the sound via the sound output module 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to one embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The wireless communication module 1492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., the millimeter (mm) Wave band) to achieve, e.g., a high data transmission rate. The wireless communication module 1492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1492 may support various requirements specified in the electronic device 1401, an external electronic device (e.g., the electronic device 1404), or a network system (e.g., the second network 1499). According to an embodiment, the wireless communication module 1492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1497 may transmit or receive a signal or power to or from the outside (e.g., the external electronic device) of the electronic device 1401. According to an embodiment, the antenna module 1497 may include an antenna including a radiating element composed of a conductive material or a conductive pattern formed in or on a substrate (e.g., a printed circuit board (PCB)). According to an embodiment, the antenna module 1497 may include a plurality of antennas (e.g., array antennas). In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

According to various embodiments, the antenna module 1497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 or 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra low-latency services using, e.g., distributed computing or mobile edge computing. In another embodiment, the external electronic device 1404 may include an internet-of-things (IoT) device. The server 1408 may be an intelligent server using machine learning and/or a neural network. According to an embodiment, the external electronic device 1404 or the server 1408 may be included in the second network 1499. The electronic device 1401 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

According to various embodiments, an electronic device (e.g., the electronic device 101 of FIG. 1, the electronic device 1401 of FIG. 14) may include a flexible display, a first housing moving to correspond to change in a shape of the flexible display, and including a contact region, a second housing sliding in a direction opposite to a direction of the first housing and mounting the flexible display, at least one rotary contact structure making contact with the contact region, and a printed circuit board (PCB) electrically connected with the at least one rotary contact structure. The at least one rotary contact structure may include a rotating part maintaining contact with the contact region while rotating in a process of changing a shape of the flexible display, a central part disposed inside the rotating part, a conductive member interposed between the rotating part and the central part, and a support part to support the central part and to electrically connect the central part with the PCB.

According to various embodiments, the rotating part may include a contact surface making contact with the contact region, and the contact surface is a curved surface.

According to various embodiments, the contact region linearly moves to correspond to the change in the shape of the flexible display.

According to various embodiments, the contact region may include a first end portion and a second end portion, the at least one rotary contact structure may make contact with the first end portion, when the flexible display is slid into the first housing, and the at least one rotary contact structure may make contact with the second end portion, when the flexible display is slid out of the first housing.

According to various embodiments, the contact region may include a first contact region and a second contact region separated from the first contact region and disposed in parallel to the first contact region.

According to various embodiments, the at least one rotary contact structure may further include an insulating part to divide the rotating part into a first contact part and a second contact part, the first contact part may make contact with the first contact region, and the second contact part may make contact with the second contact region.

According to various embodiments, the at least one rotary contact structure further may include a first rotary contact structure and a second rotation contact structure, and the first contact region may make contact with the first rotary contact structure, and the second contact region makes contact with the second rotary contact structure.

According to various embodiments, the first contact region and the second contact region may have mutually different lengths.

According to various embodiments, the first contact region may transmit or receive a signal for performing a first function, and the second contact region may transmit or receive a signal for performing a second function.

According to various embodiments, the support part may be an elastic structure formed in an axial direction perpendicular to the rotating part.

According to various embodiments, the support part may include a shaft passing through the central part.

According to various embodiments, the conductive member may include a plurality of conductive balls disposed at specified distances.

According to various embodiments, the conductive member may be disposed such that a non-conductive ball and a conductive ball are alternately arranged According to various embodiments, the conductive member may be disposed such that the non-conductive ball and the conductive ball are disposed in specified number at less than a specified angle.

According to various embodiments, the conductive member may include a plurality of conductive sponges or a plurality of conductive leaf springs.

According to various embodiments, the rotating part may include a guide which is formed on an inner surface of the rotating part to move or rotate the conductive members.

According to various embodiments, at least a portion of the first housing may function as an antenna for wireless communication, and the at least one rotary contact structure may transmit a wireless communication signal to the PCB.

According to various embodiments, the contact region may have an elastic structure protruding toward the at least one rotary contact structure.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, a rotary contact structure may include a rotating part at least partially including a conductive section, a central part disposed inside the rotating part, a conductive member interposed between the rotating part and the central part, and a support part to support the central part and to electrically connect the central part with an external PCB.

According to various embodiments, the support part may be formed to have elastic force in an axial direction perpendicular to the rotating part.

According to various embodiments of the disclosure, the electronic device may continuously maintain the electrical contact with the specified contact region, to correspond to the sliding operation of the housing by using the rotary contact structure.

According to various embodiments of the disclosure, the electronic device may prevent the contact region from being deformed or broken, by using the rotary contact structure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a flexible display;
a first housing configured to move to correspond to change in a shape of the flexible display, and including a contact region;
a second housing configured to slide in a direction opposite to a direction in which the first housing moves of the first housing and to mount the flexible display;
at least one rotary contact structure making contact with the contact region; and
a printed circuit board (PCB) electrically connected with the at least one rotary contact structure,
wherein the at least one rotary contact structure comprises:
a rotating part configured to maintain contact with the contact region while rotating in a process of changing the shape of the flexible display,
a central part disposed inside the rotating part,
a conductive member interposed between the rotating part and the central part, and
a support part configured to support the central part and to electrically connect the central part with the PCB.

2. The electronic device of claim 1,
wherein the rotating part comprises:
a contact surface making contact with the contact region, and
wherein the contact surface is a curved surface.

3. The electronic device of claim 1, wherein the contact region linearly moves to correspond to the change in the shape of the flexible display.

4. The electronic device of claim 1,
wherein the contact region comprises:
a first end portion and a second end portion,
wherein the at least one rotary contact structure makes contact with the first end portion, when the flexible display is slid into the first housing, and wherein the at least one rotary contact structure makes contact with the second end portion, when the flexible display is slid out of the first housing.

5. The electronic device of claim 1, wherein the contact region comprises:
a first contact region and a second contact region which is separated from the first contact region and disposed in parallel to the first contact region.

6. The electronic device of claim 5,
wherein the at least one rotary contact structure further comprises:
an insulating part configured to divide the rotating part into a first contact part and a second contact part,
wherein the first contact part makes contact with the first contact region, and
wherein the second contact part makes contact with the second contact region.

7. The electronic device of claim 5,
wherein the at least one rotary contact structure further comprises:
a first rotary contact structure and a second rotary contact structure,
wherein the first contact region makes contact with the first rotary contact structure, and
wherein the second contact region makes contact with the second rotary contact structure.

8. The electronic device of claim 5, wherein the first contact region and the second contact region have mutually different lengths.

9. The electronic device of claim 5,
wherein the first contact region is configured to transmit or receive a signal for performing a first function, and
wherein the second contact region is configured to transmit or receive a signal for performing a second function.

10. The electronic device of claim 1, wherein the support part is an elastic structure formed in an axial direction perpendicular to the rotating part.

11. The electronic device of claim 1, wherein the support part comprises a shaft passing through the central part.

12. The electronic device of claim 1, wherein the conductive member comprises:
a plurality of conductive balls disposed at specified distances.

13. The electronic device of claim 1, wherein the conductive member is disposed such that a non-conductive ball and a conductive ball are alternately arranged.

14. The electronic device of claim 13, wherein the conductive member is disposed such that the non-conductive ball and the conductive ball are arranged in specified number at less than a specified angle.

15. The electronic device of claim 1, wherein the conductive member comprises a plurality of conductive sponges or a plurality of conductive leaf springs.

16. The electronic device of claim 1, wherein the rotating part comprises:
a guide formed on an inner surface of the rotating part to move or rotate the conductive member.

17. The electronic device of claim 1,
wherein at least a portion of the first housing functions as an antenna for wireless communication, and
wherein the at least one rotary contact structure transmits a wireless communication signal to the PCB.

18. The electronic device of claim 1, wherein the contact region has an elastic structure protruding toward the at least one rotary contact structure.

* * * * *